Jan. 14, 1958          LE ROY LETNEY          2,819,975
METHOD OF COATING FRESHLY CUT SURFACES OF MEAT
Filed Dec. 24, 1953
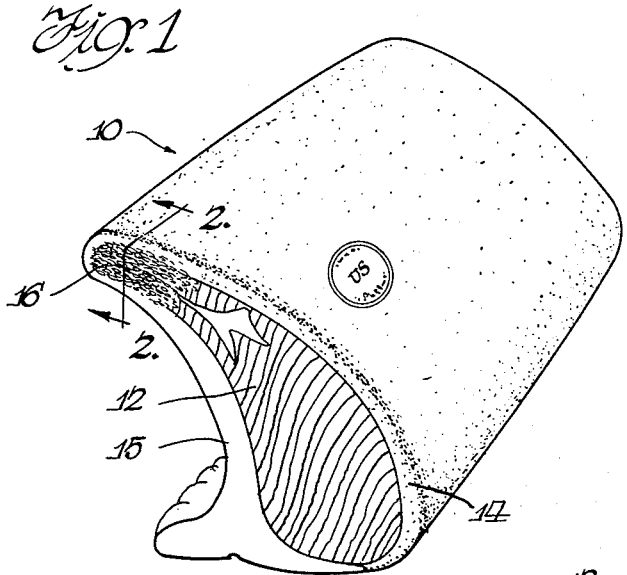
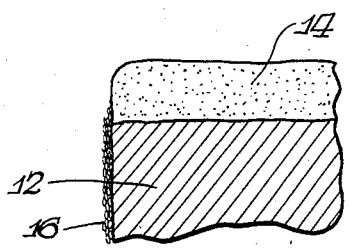
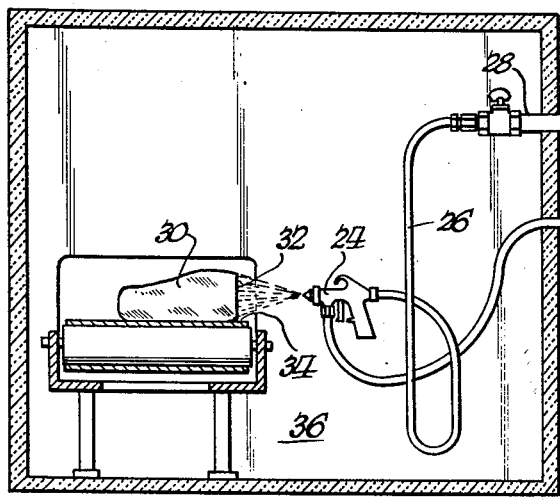
Inventor
Le Roy Letney
by Bair, Freeman & Molinare
Attys.

United States Patent Office 2,819,975
Patented Jan. 14, 1958

2,819,975
METHOD OF COATING FRESHLY CUT SURFACES OF MEAT

Le Roy Letney, Waterloo, Iowa, assignor to The Rath Packing Company, Waterloo, Iowa, a corporation of Iowa Application December 24, 1953, Serial No. 400,269

3 Claims. (Cl. 99—169)

This invention relates to a novel protective coating for freshly-cut surfaces of meat, and to a method of applying such a coating.

It is well known that cut surfaces of meat, that is, surfaces that are not protected by the natural fat covering, become dehydrated in storage with an accompanying darkening in the color of the meat. Such deterioration renders that meat unattractive and unpalatable. Consequently, the retail butcher finds it necessary to "face" such surfaces to expose the fresh bloom, and this obviously results in much waste.

To remedy this situation it has been proposed heretofore to dip the freshly cut surface of the meat into molten fats and permit the fat to solidify over the freshly cut surface to provide a protective film for preserving the bloom of the meat. Meat has also been completely immersed in fats and oils to accomplish this same end. These methods form coatings which prevent the air from coming in contact with the meat. Because air cannot permeate the oil or fat film, the resulting anaerobic conditions enhance the growth of certain sliming molds, and bacteria. Furthermore, in the case of a fat coating the solidified film is brittle, and as a result usually cracks and then flakes off when handling the meat, thus eliminating completely the protective coating.

One object of the invention is the provision of a coating that will effectively prevent any substantial darkening of the cut surface of the meat, reduce dehydration, and not render the meat unpalatable if cooked with the coating on.

Another object is to provide a method for applying such coating to the freshly cut surfaces of meats. These and other objects will become apparent from the following description and appended claims.

The drawings which form a part of this specification are intended to illustrate the invention, but not to limit it to the particular embodiments set forth. It is to be understood that the invention is capable of various modifications, and it is, therefore, my intention not to limit the invention other than by the scope of the appended claims.

In the drawings:

Figure 1 is a perspective view of a piece of meat having a freshly cut exposed surface which is coated in accordance with the invention.

Figure 2 is an exaggerated cross-sectional view taken along the line 2—2 of Figure 1.

Figure 3 is an elevational diagrammatic view of spraying apparatus which may be used to apply a fat coating to meat in accordance with the method of the invention.

The objectives of this invention are achieved by spraying molten fat droplets through an atmosphere maintained at a temperature low enough to cause the droplets to congeal or partly solidify as they travel toward the meat through the low temperature atmosphere, and permitting the droplets to deposit on the freshly cut surface to be protected, which surface has been previously chilled.

The fat droplets are deposited on the surface of the meat in random layers, the individual droplets being piled up in closely abutting relation, higher at some points than others. In this manner a thin flexible coating is obtained consisting of a myriad of tiny droplets which vary in size and resemble frost or flour in appearance. Because of its peculiar structure, the coating is flexible and does not flake of. It appears that the individual droplets permit flexing with respect to each other whereas a solid fat film is very brittle and will readily crack and flake off. Furthermore, the space between the deposited droplets permits the diffusion of air and this prevents anaerobic bacteria from growing beneath the fat coating. I have found that a fat coating applied in this manner will greatly lengthen the storage life of fresh meat at refrigerator temperature in that dehydration at the surface is substantially lessened and the bloom of the meat retained. If the fat is sprayed on the freshly cut surface within a very short time after cutting, the original bloom will appear upon removing the sprayed coating after storage.

It is preferred that the fat applied to the meat be obtained from the same specie of animal as the meat itself. By using a like fat the protective qualities of the film seem to be superior to films consisting of fats from other sources. In addition, the use of fat from the same specie of animal imparts no unfamiliar flavor to the meat, which is true when oils and fats from other sources are used. Of course, the method of the invention may be used to apply foreign fats if desired.

Referring now to the drawing, in Figure 1 a beef rib 10 consisting of lean 12, fat 14, and bone 15, has been cut so that the lean portion 12 is exposed. Fat droplets, piled up in layers to form a thin coating 16 that resembles frost in appearance, serves to protect a portion of the freshly-cut surface of the piece of meat 10. In the drawing the film 16 covers only a portion of the cut surface, but it is to be understood that the entire cut surface should be protected. The structure of the coating is better shown in the cross-sectional view of Figure 2 in which the coating 16 is exaggerated. It will be noted that the coating consists of a myriad of different sized closely-abutting droplets which comprise a thin uniform cover over the surface 12.

Means for applying the fat to the meat in accordance with the invention is illustrated in Figure 3. Molten fat 21 is supplied from a hot-water-jacketed reservoir 20, the temperature of which is maintained above the melting point of the fat so that the fat is completely liquid. The temperature of the molten fat should be such that upon spraying it will partially solidify as it passes from the nozzle to the cut surface of the meat. The molten fat is supplied from the reservoir through a tube 22 to a spray gun 24 located inside an enclosed cooled space 36 where the spraying takes place.

A second tube 26 connects the spray gun to a source of cleaned compressed air through the valved conduit 28. Air passing through the nozzle of the gun atomizes the molten fat which flows to the gun by gravity through tube 22, sending forth a spray of tiny droplets into the cooled atmosphere 36. The piece of meat 30, having a freshly cut surface 32 which is to be coated, is advanced past the spray gun on a moving conveyor belt 34. A satisfactory distance from the nozzle to the meat surface is from 10 inches to 20 inches. The surface 32 of the meat has been previously chilled to a temperature of from 36° to 40° F. Customarily the meat is chilled immediately after slaughter and maintained at a temperature of about 36° F. during the entire packing process. The temperature of the enclosed space 36 in which the spraying takes place is below 40° F., preferably around 36° F.

As the fat droplets emerging from the end of the nozzle of the gun 24 advance toward the surface 32 of the meat they congeal due to loss of heat to the atmosphere. Therefore, when the droplets are deposited on the surface 32 they retain their individuality and pile up as integers in the manner indiacted at 16 in Figure 2.

The temperature at which the fat is maintained depends, of course, upon the particular fat being used, the temperature of the meat and the temperature of the atmosphere in which the spraying is carried out. In the case of beef tallow, which is used primarily to coat the freshly cut surfaces of beef, a temperature of from 140° to 160° F. is suitable where both the temperature of the atmosphere and the temperature of the meat ranges from 35°–40° F. In coating freshly cut surfaces of pork, I prefer to use lard which will become completely molten at a lower temperature. Preferably, the temperature should not be any higher than necessary to maintain the fat in molten condition. If the fat is too hot it may not congeal in moving through the distance from the nozzle of the spray gun to the surface of the meat. It is possible to compensate for higher fat temperatures by increasing the distance from the nozzle to the meat surface, or by reducing the temperature of the atmosphere, other conditions remaining constant.

Meat surfaces coated in this manner remain fresh for long periods of time under refrigeration and the coating remains intact and adhered to the surface of the meat even when the meat is being handled roughly, as during shipment for instance.

To determine the ability of a sprayed beef tallow coating, applied in accordance with the invention, to protect freshly cut meats, the following experiments were conducted.

Three sets of fresh cut, choice grade matched ribs were chosen for the test. The exposed lean surface of each rib taken from the left side of the animal were spray coated with beef tallow in accordance with the procedure set forth above. The temperature of the meat was approximately 38° F., the atmosphere 38° F., and the molten beef tallow 150° F. The right side ribs were not treated and served as controls. After five days' storage at 34° F., the tallow was scraped from the coated ribs. Examination indicated that the protected meat surfaces were much superior to the control samples, both in color retention and condition of the lean surfaces. The uncoated surfaces darkened and withered, while the coated surfaces retained the original bloom and remained moist. The percentage of shrinkage in the case of the uncoated ribs was generally higher.

In a second experiment three pairs of matched beef ribs were employed. The exposed lean surfaces of the ribs from the left side were sprayed with beef tallow using the spray method just described. The ribs of the right side were coated with the same beef tallow by brushing a film over the cut surfaces. After five days' storage at 34° F. the ribs were examined. After the frosty sprayed coating was scraped off the left ribs, the meat exhibited the same bright appearance of a freshly cut surface. The tallow coating that was brushed on the right ribs had cracked in many places, although the ribs had not been handled after being set on aging racks. At the cracks there were visible amounts of moisture and a definite darkening of the meat. After removal of the brushed tallow coating, the outline of the cracks appeared on the cut surface. The ribs treated with sprayed tallow in accordance with the invention were obviously superior in appearance to those which had been brush coated.

As indicated, the invention is not limited to treating beef, but is suitable for the preservation of pork, lamb and veal as well.

Throughout the specification and in the appended claims the expression "freshly cut surface" is intended to mean a cut surface that has not dehydrated or discolored to any substantial extent and it is not limited to a surface in its condition immediately after cutting.

What is claimed is:

1. A method of coating freshly cut meat surfaces to prevent dehydration and preserve bloom which comprises providing a piece of meat having an exposed freshly cut surface at a temperature below 40° F., spraying a molten fat through a chilled atmosphere maintained substantially below the temperature required to congeal said molten fat to produce congealed droplets, permitting said droplets to deposit individually on said freshly cut surface, thereby forming a porous protective coating thereover.

2. A method of coating freshly cut meat surfaces to prevent dehydration and preserve bloom which comprises providing a piece of meat having a freshly-cut surface at a temperature below 40° F., spraying a molten fat obtained from the same specie of animal as said meat through a chilled atmosphere maintained substantially below the temperature required to congeal said molten fat to produce congealed droplets, permitting said droplets to deposit individually on said freshly cut surface, thereby forming a porous protective coating thereover.

3. A method of coating freshly cut surfaces of beef to prevent dehydration and preserve bloom which comprises providing a piece of beef having a freshly-cut surface at a temperature of about 36° F., spraying molten beef tallow through an atmosphere maintained at below 40° F. to produce congealed tallow droplets, permitting said droplets to deposit individually on said freshly cut surface, thereby forming a porous protective coating thereover.

References Cited in the file of this patent

UNITED STATES PATENTS

| 2,290,854 | Hoy | July 28, 1942 |
| 2,462,760 | Mitchell et al. | Feb. 22, 1949 |
| 2,551,463 | Ramsbottom | May 1, 1951 |

FOREIGN PATENTS

| 14,643 of 1910 | Great Britain | Feb. 23, 1911 |
| 399,648 | Great Britain | Oct. 12, 1933 |
| 454,536 | Canada | Feb. 8, 1949 |